United States Patent [19]
Fu et al.

[11] Patent Number: 5,909,084
[45] Date of Patent: Jun. 1, 1999

[54] KIT FOR INSTALLING DAYTIME RUNNING LIGHTS ON A VEHICLE

[76] Inventors: Sam Fu; Calvin S. Wang, both of 14317 Don Julian St., City of Industry, Calif. 91746

[21] Appl. No.: 08/934,579

[22] Filed: Sep. 22, 1997

[51] Int. Cl.$^6$ ................................................. H05B 37/02
[52] U.S. Cl. ............................ 315/82; 307/10.8; 315/225; 315/307
[58] Field of Search ................... 315/82, 209 R, 315/225, 307; 307/10.8

[56] References Cited

U.S. PATENT DOCUMENTS

| | | | |
|---|---|---|---|
| 4,684,819 | 8/1987 | Haag et al. | 315/82 |
| 5,780,974 | 7/1998 | Pabla et al. | 315/8 |

*Primary Examiner*—Michael B Shingleton
*Attorney, Agent, or Firm*—Albert O. Cota

[57] ABSTRACT

A daytime running lights adapter kit (10) which is designed to be installed in a vehicle to allow the vehicle to be equipped with daytime running lights. The kit (10) is enclosed within a single enclosure (12) that encloses an electronic unit (14). From the unit (14) extends a set of cable assemblies (40–46) that have attached a set of connectors (30–36). Each connector is keyed to fit into an existing vehicle receptacle (56, 58, 62, 64) that are each connected to the particular vehicle light that is to function as a daytime running light. The daytime running lights adapter kit (120) is enabled and turns on the particular lights only when the vehicle engine (50) is operating and the manual frontlight switch (54) is off. When the vehicle engine (50) is turned off or the frontlight switch (54) is placed in the on position, the kit (10) is disabled.

8 Claims, 7 Drawing Sheets

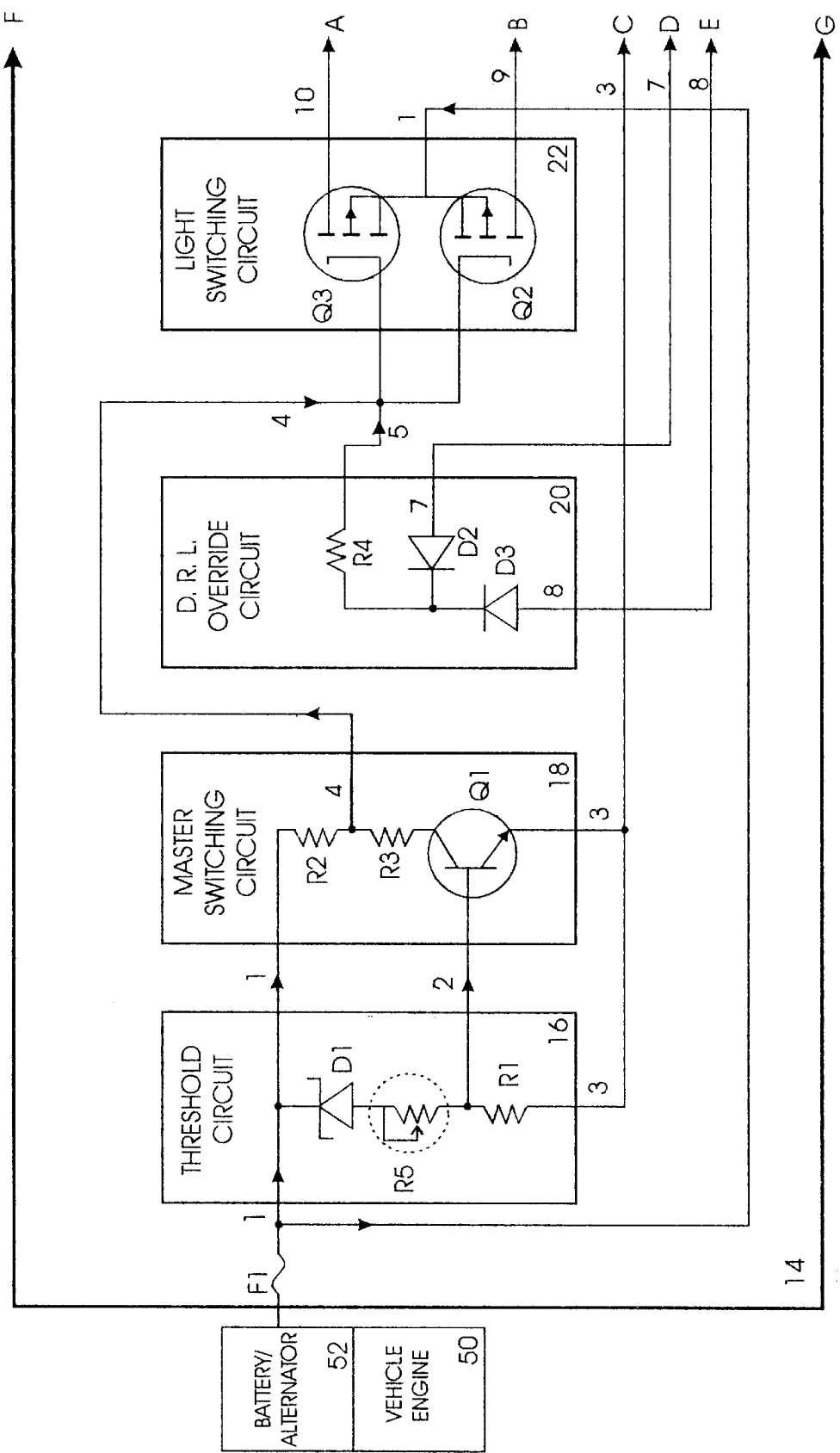
FIGURE 1-A

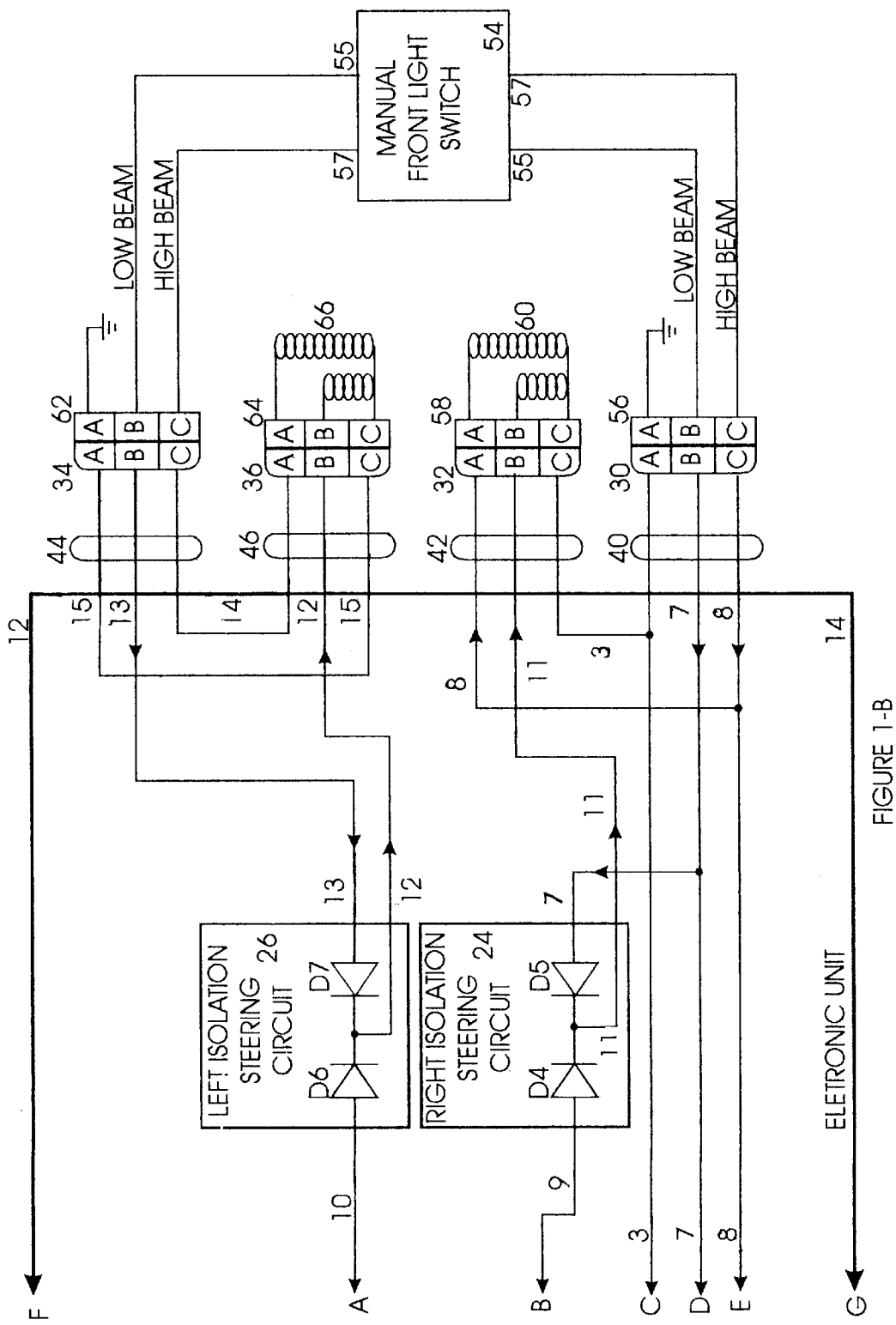
FIGURE 1-B

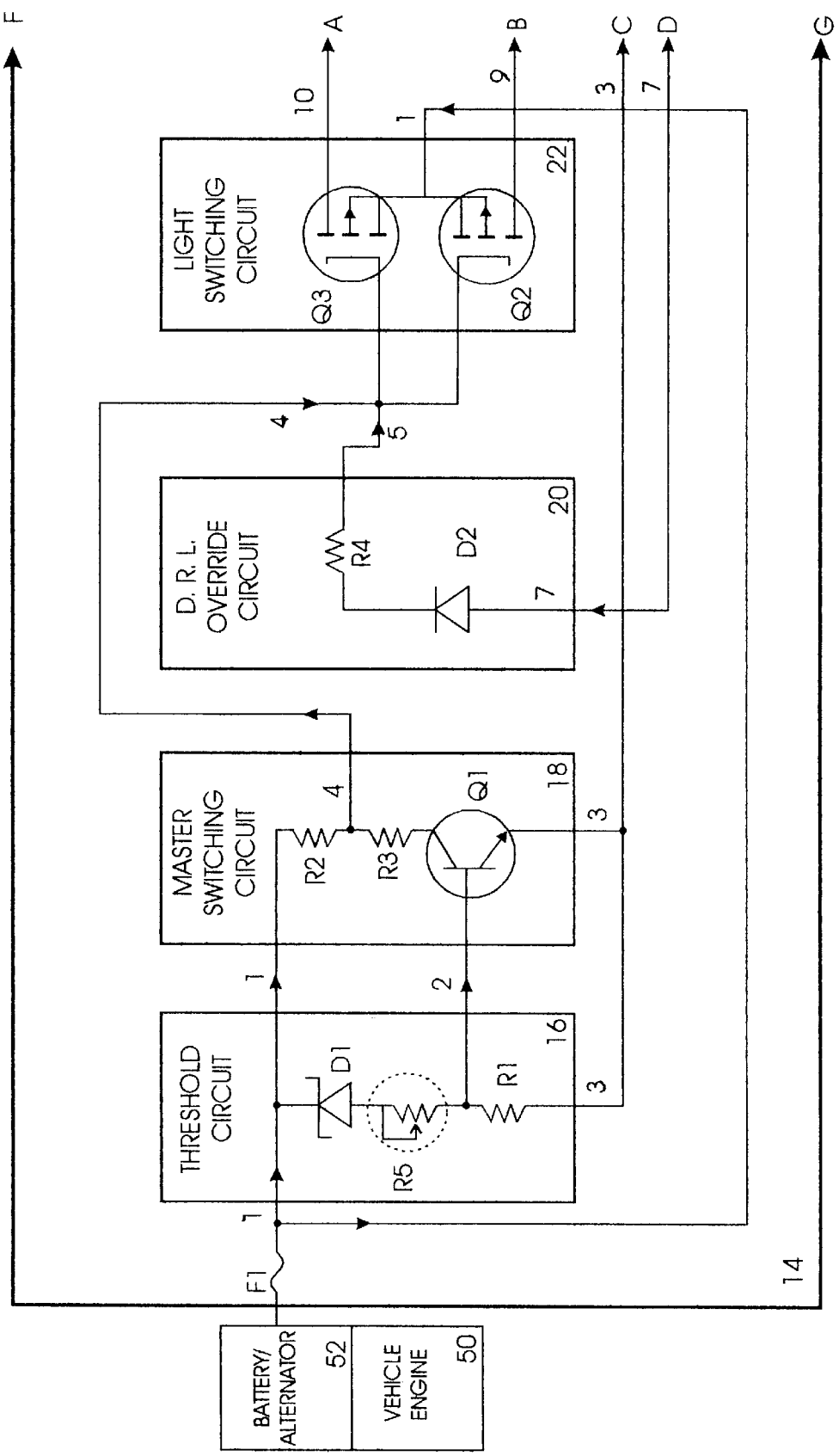
FIGURE 2-A

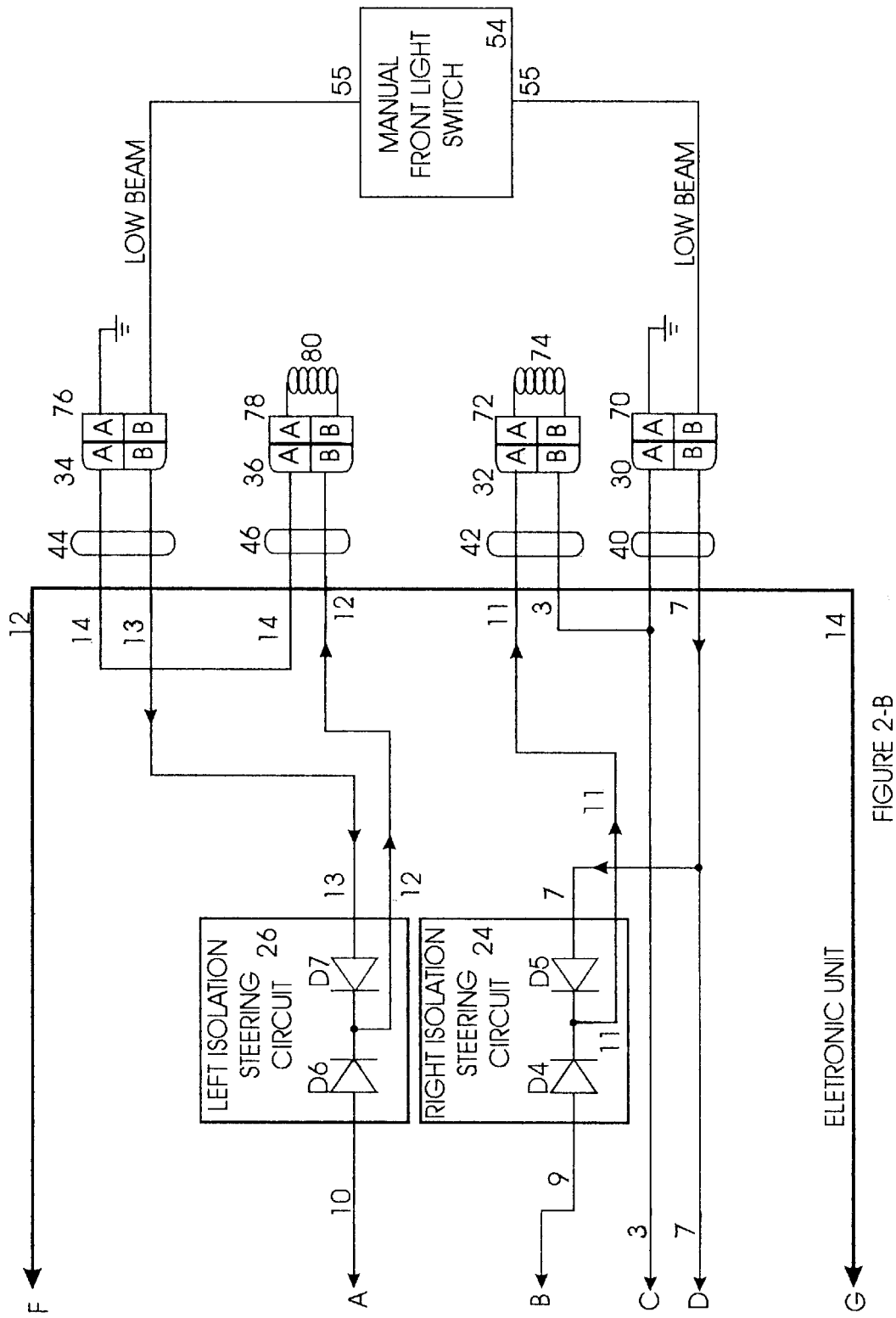
FIGURE 2-B

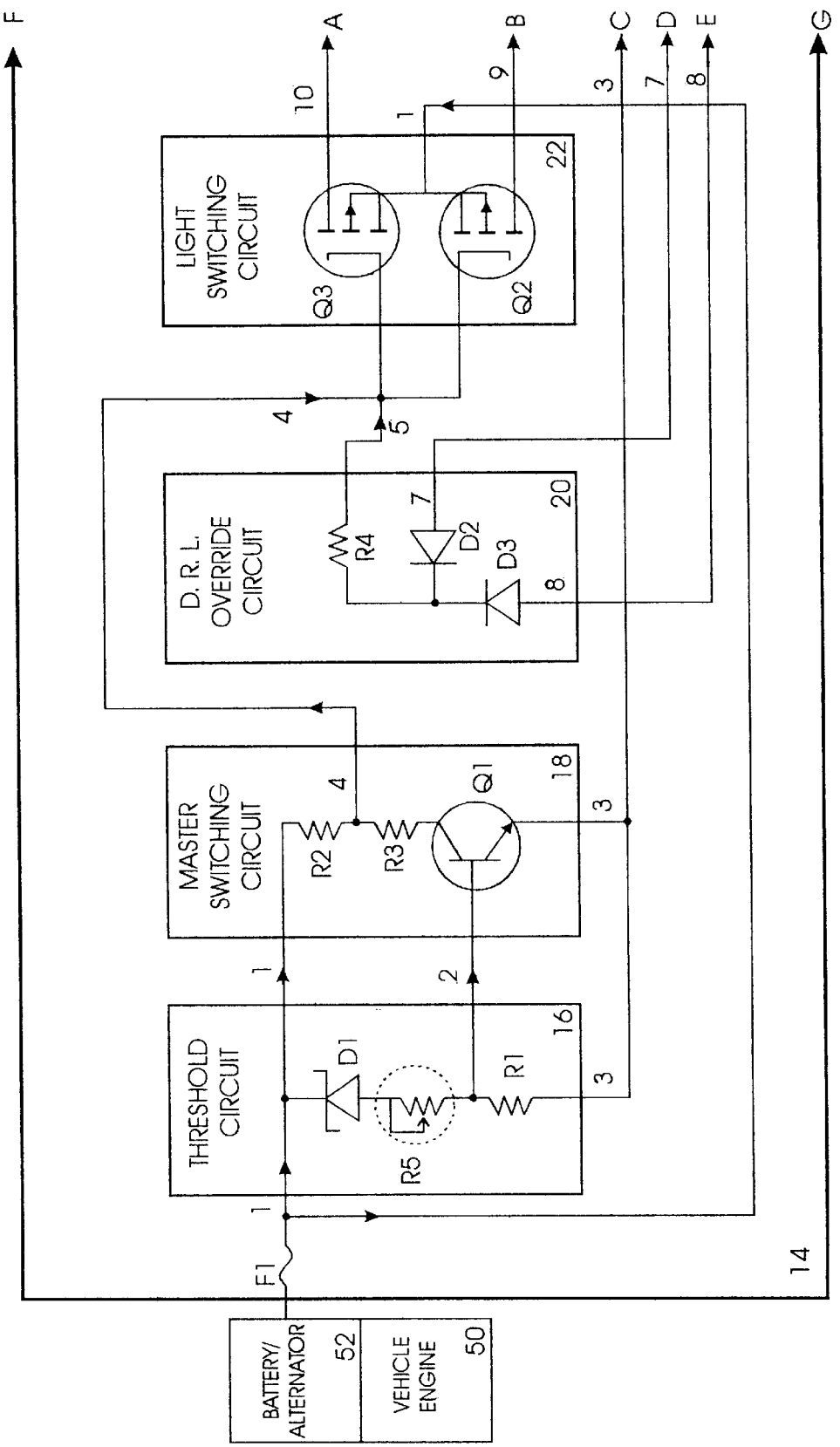
FIGURE 3-A

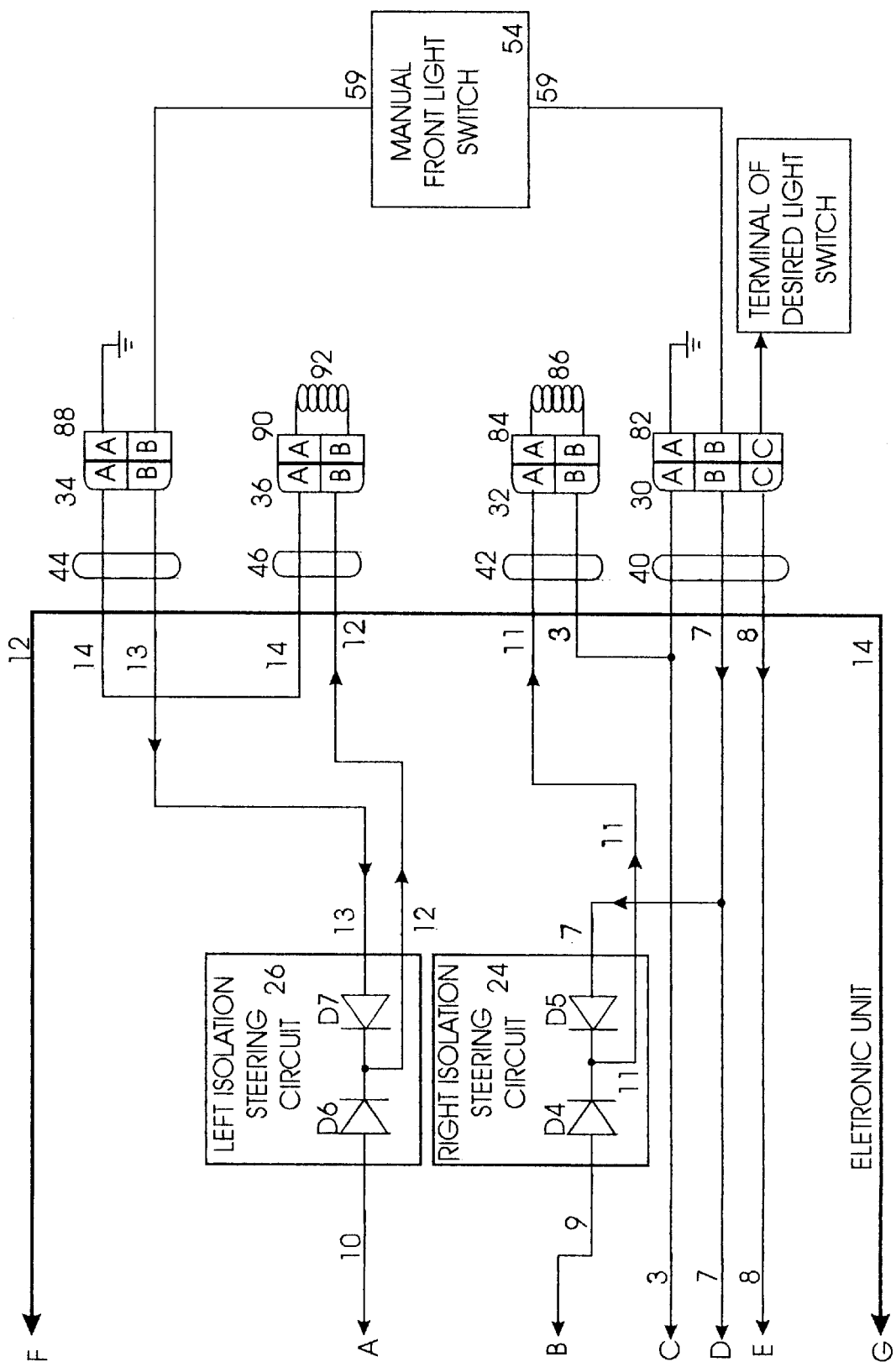
FIGURE 3-B

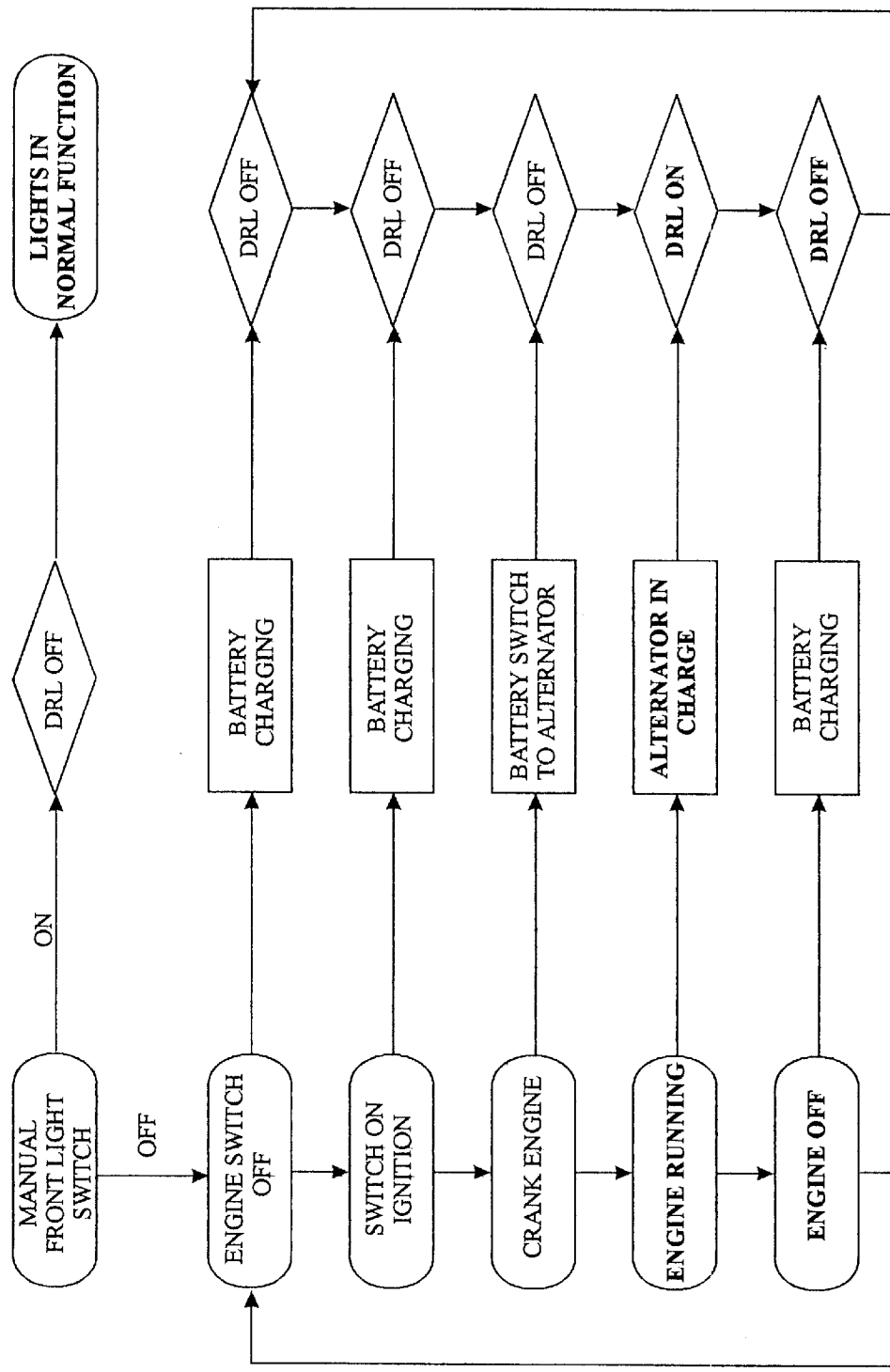

KIT FOR INSTALLING DAYTIME RUNNING LIGHTS ON A VEHICLE

TECHNICAL FIELD

The invention pertains to the general field of vehicle lights and more particularly to a modification kit which allow daytime running lights to be installed on a vehicle.

BACKGROUND ART

As automobiles have become an overwhelming presence in many person's everyday lives, so to has the need to improve upon the safety characteristics of automobiles. One of the most common safety deficiencies is caused by one motorists inability to sufficiently see another vehicle. This scenario is caused by many different contributing factors, for example: a vehicle is located in what is commonly referred to as a "blind spot" or in other words, neither the interior rear-view mirror nor the side rear-view mirror is able to provide a reflection of another vehicle or vehicles which may be in the way. IF a motorist desires to change or alter his/her vehicle's position relative to the roadway, and does not view any other vehicles, he/she will usually proceed. Only, after it is too late, will the presence of another vehicle become known to the motorist. It is important to remember that "blind spots" are not the sole cause of these types of accidents. At any given moment while driving a vehicle, a motorist is constantly deluged with hundreds, or possibly thousand of distractions. These distractions vary from pedestrians moving about to stationary items such as trees and buildings and even to public displays for advertisement purposes. This last example is designed to attract the attention of motorists. When considered together, it is easy to comprehend how distractions while driving are a significant contribution to many automobile accidents.

As anyone who drives is well aware of, the two indicators of an emergency or law enforcement vehicle responding to a crisis are the combination of sirens/horns and/or flashing lights. Even more particular is the protocol which requires that when law enforcement officials are enroute to an immediate situation, and the use of sirens or horns might alert would-be criminals, the sirens are not utilized; and the only indication of the law enforcement vehicles purpose are the flashing lights. When other motorists see the lights they know to pull to the right and allow the vehicle to pass unimpeded. Also, when one considers that many of today's automobile audio components are capable of completely encapsulating in sound any occupants of a vehicle and thus making it impossible to hear any outside noises. The importance of the lights as a visual announcement are all the more exemplified.

The reason lights are utilized results from the findings of scientific studies that have proven the human eye will be attracted to and subsequently directed at a light. What is now viewed as an obvious solution to the problem of the increased need of motorists to be able to see other motorists, especially in the midst of many distractions, is that of vehicles equipped with a constant light source while moving. Although some people were of the opinion that lights were useless during daylight, it has been proven that even in bright daylight, human eyes are still attracted to an artificial light source.

The benefits of lights utilized on a constant basis during the operation of an automobile is now known to be a substantially beneficial addition and will according to predictions, significantly contribute to the lowering of many automobile accidents and conversely save some people's lives.

A search of the prior art did not disclose any patents that read directly on the claims of the instant invention however, the following U.S. patents were considered related:

| U.S. PAT. NO. | INVENTOR | ISSUED |
| --- | --- | --- |
| 5,438,237 | Mullins, et al | Aug. 1, 1995 |
| 5,416,384 | Bavaro | May 16, 1995 |
| 5,374,852 | Parkes | Dec. 20, 1994 |

The 5,438,237 patent discloses an automatic daytime running light system for a vehicle having an engine, an electric power source, a starter motor circuit for the engine, external running lights and input switches that control an ignition circuit as well as the external running lights. The system is responsive to the input switches, and the starter motor includes a digital-logic timer circuit that automatically controls the operation of the running lights. The circuit also includes MOSFET switching devices, which provide high reliability and safety, redundant circuitry to provide a higher level of reliability, fail-safe operation and a fault detection circuit.

The 5,416,384 patent discloses an emergency lighting system that provides an emergency driving voltage to drive at least one lamp when the AC power input to the lamp is not present. A rechargeable battery pack and recharging circuit are contained in a first modular housing, and driving circuitry is contained in a second modular housing. The system also includes a test switch to emulate power failure, a transmitter and receiver mechanism which allows a user to remotely disable the battery power to the driving circuitry and a photo-sensing mechanism which disables the battery power if there is sufficient ambient light.

The 5,374,852 patent discloses a lighting control apparatus for a motor vehicle that includes an electrical power supply, an ignition switch, lights, a lighting control switch for illuminating the lights, a wiper device, and a wiper control switch for actuating the wiper device. The apparatus, which automatically illuminates the lights whenever the wiper device is actuated, includes a photosensitive element electrically connected in series between the electrical power supply and the lights. The photosensitive element, which is illuminated by ambient light, has a first conductive state whenever the intensity of the ambient light is below a first threshold value. The photosensitive element additionally has a second nonconductive state whenever the intensity of the ambient light exceeds a second threshold value, and a mechanism for moving a shutter to a first position which shields the photosensitive element from the ambient light whenever the wiper control switch actuates the wiper device.

DISCLOSURE OF THE INVENTION

The daytime running lights adapter kit (hereinafter D.R.L. adapter kit) is designed to modify the existing front lighting system of a vehicle to include daytime running lights. In its most basic form and function, the D.R.L. adapter kit operates in combination with a vehicle that includes an engine, a battery/alternator, and a manually operated frontlight switch which controls the operation of a vehicle frontlight(s). The D.R.L. adapter kit comprises:

a) means for being connected to and operated from the vehicle battery/alternator, b) means for being connected to the vehicle frontlight(s), c) means for automatically turning on the vehicle frontlight(s) when the frontlight switch is off, the vehicle engine is started and the vehicle alternator is charging the vehicle battery, d) means for automatically turning off the vehicle frontlight(s) when the vehicle engine is turned off, and e) means for automatically disabling the daytime running lights adapter kit when the frontlight switch is turned on.

The D.R.L. adapter kit is disclosed in three design configurations. In the first design, the kit is configured to operate a pair of H4 bulbs or sealed beam lights having both a low-beam filament and a high beam filament. In the second design, the kit is configured to operate separated headlights that utilize a 9005 low-beam bulb. In the third design, the kit is configured to operate a pair of fog lights or auxiliary lights.

In all of the above designs, the lights are controlled by a manual frontlight switch. The details of this switch are not provided as it is well known in the prior art. However, for this discussion and circuit explanation, the frontlight switch is intended to include means for controlling the operation of each of the above-disclosed lights that function as daytime running lights.

The D.R.L. adapter kit is designed not to interfere with the normal operation of the vehicle lights. The kit is further designed with a set of cables and connectors that are specifically designed to operate a particular set of lights as found on a particular vehicle brand.

In view of the above disclosure, it is the primary object of the invention to provide a D.R.L. adapter kit that is easily installed, does not interfere with the normal operation of the vehicle lights and that fulfills the requirements of having daytime running lights. In addition to the primary object of the invention, it is also an object to provide a D.R.L. adapter kit that:

reduces the probability of an accident, can be easily installed in various locations of a vehicle's body, can be installed with no cutting, splicing or altering of existing vehicle wiring cable assemblies, can be easily removed and transferred to another vehicle having a similar frontlight system, uses solid-state electronics to provide a high-reliability kit, and is cost effective from both manufacturer and consumer points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIGS. 1A and 1B are combination schematic and block diagrams of a first D.R.L. adapter kit design that incorporates a set of cable assemblies and connectors that operate vehicle headlights that utilize an H4 bulb or sealed beam headlights.

FIGS. 2A and 2B are combination schematic and block diagrams of a second D.R.L. adapter kit design that incorporates a set of cable assemblies and connectors that operate vehicle headlights that are separated and use a 9005 bulb as a low-beam bulb.

FIGS 3A and 3B are combination schematics and block diagrams of a third D.R.L. adapter kit design that incorporates a set of cables and connectors that operate vehicle fog lights or auxiliary lights.

FIG. 4 is a flow diagram showing the various operational modes in which the D.R.L. is either enabled or disabled.

BEST MODE FOR CARRYING OUT THE INVENTION

The best mode for carrying out the invention is presented in terms of a preferred embodiment for a daytime running lights adapter kit 10 (hereinafter D.R.L. adapter kit 10) which allows daytime running lights to be installed in a vehicle. The preferred embodiment of the D.R.L. adapter kit 10, as shown in FIGS. 1A, 1B, 2A, 2B, 3A, 3B and 4 is disclosed in three design configurations. Each design configuration utilizes the same electronic unit 14 but differs in that the output of the electronic unit 14 is attached to a different vehicle frontlight via a specific set of cable assemblies.

The first design configuration of the D.R.L. adapter kit 10, as shown in FIGS. 1A and 1B, utilizes an electronic unit 14 which operates in combination with a vehicle that includes: an engine 50, a battery/alternator 52, a manual frontlight switch 54 having a low-beam terminal 55 and a high-beam terminal 57; a right switch receptacle 56 having a pin A connected to circuit ground, a pin B connected to the low-beam terminal 55 of the frontlight switch 54 and a pin C connected to the high-beam terminal 57 of the frontlight switch 54; a right headlight receptacle 58 having a pin A, a pin B and a pin C; a right H4 bulb or sealed beam light 60 having a high beam filament connected to pin A of the right headlight receptacle 58, a low beam filament connected to pin B of the right headlight receptacle 58 and a common filament lead connected to pin C of the right headlight receptacle 58; a left switch receptacle 62 having a pin A connected to circuit ground, a pin B connected to the low-beam terminal 55 of the frontlight switch 54 and a pin C connected to the high-beam terminal 57 of the frontlight switch 54; a left headlight receptacle 64 having a pin A, a pin B and a pin C; a left H4 bulb or sealed beam light 66 having a high beam filament connected to pin A of the left headlight receptacle 64, a low beam filament connected to pin B of the left headlight receptacle 64 and a common filament lead connected to pin C of the left headlight receptacle 64.

The D.R.L. adapter kit 10 is comprised of the following major elements: and enclosure 12 into which is enclosed an electronic unit 14. The unit 14 is further comprised of a circuit protective device, such as a fuse F1, which may be located either internal or external to the enclosure 12; a threshold circuit 16, a master switching circuit 18, a D.R.L. override circuit 20, a light switching circuit 22, a right isolation steering circuit 24, and a left isolation steering circuit 26. External to the electronic unit 14 extends a first cable assembly 40 connected to a right switch connector 30, a second cable assembly 42 connected to a right headlight connector 32, a third cable assembly 44 connected to a left switch connector 34, and a fourth cable assembly 46 connected to a left headlight connector 36.

To commence the operation of the D.R.L. adapter kit 10, the voltage from the battery 52 is applied to the electronic unit 14 through the fuse F1. As shown in FIG. 1A, the fuse has a first side that is connected to the vehicle battery/alternator 52 and a second side from where is produced a first signal which corresponds to the voltage of the battery/alternator 52.

The battery/alternator voltage is applied to the threshold circuit 16 which is comprised of a zener diode D1 having an anode and a cathode, and a resistor R1 having a first side and a second side. The cathode of D1 is applied to the first signal from the fuse F1 and the anode of D1 is connected to the first side of resistor R1. From the junction of diode D1 and resistor R1 is produced a second signal and from the second side of resistor R1 is connected a third signal that is connected to circuit ground. As shown in FIG. 1A, the threshold circuit may also include a variable resistor R5 that functions as a trimmer and that is connected to the junction of diode D1 and resistor R1. The resistor R5 further controls the accuracy of the voltage of the second signal which is applied to the base of transistor Q1 as discussed infra.

The master switching circuit 18 is comprised of an NPN trnasistor Q1 having a base, a collector and an emitter. A resistor R2 having a first side and a second side and a resistor R3 also having a first side and a second side. The first side of resistor R3 is connected to the collector of transistor Q1 and the second side is connected in series with the first side of the resistor R2. The second side of resistor R2 is also connected to the first signal as shown in FIG. 1A. The second signal from the threshold circuit 16 is applied to the base of transistor Q1 and the emitter of Q1 is connected to circuit ground via the third signal. From the junction of resistors R2 and R3 is produced a fourth signal.

The DRL override circuit 20 is comprised of a resistor R4 having a first side and a second side, and a pair of diodes D2 and D3 each having an anode and a cathode. The cathode of diodes D2 and D3 are connected together to form a junction which is connected to the first side of resistor R4. From the second side of resistor R4 is produced a fifth signal, to the anode of diode D2 is applied a seventh signal and to the anode of diode D3 is applied an eighth signal. The derivation of the seventh and eighth signals are described infra.

The light switching circuit 22 is comprised of a pair of p-channel power MOSFET's Q2 and Q3 each having a gate, a source and a drain. The gate of Q2 is connected to the gate of Q3 and both gates are connected to a junction consisting of the fourth and fifth signals wherefrom is produced a sixth signal. The source of Q2 is connected to the source of Q3 and both sources are connected to the first signal applied from the second side of the fuse F1. From the drain of Q2 is produced a ninth signal and from the drain of Q3 is produced a tenth signal.

The right isolation steering circuit 24 consists of a pair of diodes D4 and D5, each having an anode an a cathode. To the anode of D4 is applied the ninth signal from the light switching circuit 22 as shown in FIG. 1B. The cathodes of diodes D4 and D5 are connected together to form a junction from where is produced an eleventh signal. To the anode of diode D5 is applied the seventh signal as described infra.

The left isolation steering circuit 26 consists of a pair of diodes D6 and D7, each having an anode and a cathode where to the anode of D6 is applied the tenth signal from the light switching circuit 22. The cathodes of diodes D6 and D7 are connected together to form a junction from where is produced a twelfth signal and to the anode of diode D7 is applied a thirteenth signal. The right switch connector 30 includes a pin A wherefrom is produced the grounded third signal, a pin B from where the seventh signal is produced and a pin C wherefrom is produced the eighth signal. The right switch connector 30 is connected to the right switch receptacle 56 via the first cable assembly 40 as shown in FIG. 1B.

The right headlight connector 32 includes a pin A that receives the eighth signal, a pin B that receives the eleventh signal and a pin C that is connected to pin A of the right switch connector 30 which is connected to the ground third signal. The right headlight connector 32 is connected to the right headlight receptacle 58 via the second cable assembly 42.

The left switch connector 34, as shown in FIG. 1B, includes a pin A wherefrom is produced a grounded fifteenth signal, a pin B from where the thirteenth signal is produced an a pin C from where a fourteenth signal is produced. The left switch connector 34 is connected to the left switch receptacle 62 via the third cable assembly 44.

The final element that comprises the D.R.L. adapter kit 10 is the left headlight connector 36. This connector has a pin A that is connected to the fourteenth signal from pin C of the left switch connector, a pin B that receives the twelfth signal and a pin C that is grounded via the fifteenth signal that is connected to pin A of the switch connector. The left headlight connector is connected to the left headlight receptacle via the fourth cable assembly 46.

Operation

The operation of the D.R.L. adapter 10 is shown in the D.R.L. flow diagram of FIG. 4 and functions in accordance with the following steps:

1. The D.R.L. adapter kit 10 is disabled when the vehicle engine 50 is off and the manual frontlight switch 54 is off. The first signal, which is the nominal battery voltage of between 12 to 13.5 volts, is applied from fuse F1 to the threshold circuit 16. From the circuit 16 the second and third signals are produced.

2. The second signal is applied from the threshold circuit 16 to the base of transistor Q1 located in the master switching circuit 18. When the nominal battery voltage is being applied, transistor Q1 is below its "turn on" level thus, Q1 remains off an no current flows through resistor R2, resistor R3 and transistor Q1. Additionally, there is no voltage drop across resistor R2 which causes the fourth signal and the voltage at the collector of Q1 to remain at the nominal battery voltage. The fourth signal is applied to the gate leads of MOSFET's Q2 and Q3 located in the light switching circuit 22. This voltage prevents the MOSFET's Q2 and Q3 from conducting which maintains the D.R.L. adapter kit 10 in the disabled condition and keeps the H4 bulb or sealed beam lights off.

3. When the vehicle engine 50 is started with the frontlight switch 54 still in the off position, the vehicle alternator 52 delivers a voltage that ranges between 13.8 to 14.2 volts, to the vehicle's electrical power system. When this voltage, which is higher that the nominal battery voltage, is applied to the threshold circuit 16, a higher level second signal is produced which is applied to the base of transistor Q1 located in the master switching circuit 18. The application of the second signal allows the threshold level of Q1 to be exceeded causing Q1 to conduct. When Q1 conducts, it produces a voltage drop across resistor R2 which causes the fourth signal to decrease to the lower voltage level. The voltage of the fourth signal is set to an optimum level by the values selected for resistors R2 and R3.

4. The fourth signal from the master switching circuit 18 is applied to the gates of MOSFET's Q2 and Q3 causing them to conduct. The conducting MOSFET's allows the ninth signal from Q2 to pass through diode D4 to produce the eleventh signal which is then applied to the right headlight connector 32 and the right headlight receptacle 58.

The application of the eleventh signal closes the circuit for the filament of the right light bulb which causes the "low beam"of the right H4 bulb or sealed beam light to illuminate. Likewise, the conducting MOSFET Q3 allows the tenth signal to pass through the diode D6 to produce the twelfth signal which is applied to the left headlight connector 36 and the left headlight receptacle 64. The application of the twelfth signal closes the circuit for the filament of the left light bulb which then causes the "low beam" of the left H4 bulb or sealed beam light to illuminate. The brightness of the lights is determined by the voltage applied to the gate leads of Q2 and Q3. The lower the gate voltage, the more Q2 and Q3 conduct and the brighter the lights.

5. The diodes D2 and D3 located in the DRL override circuit 20, diodes D4 and D5 located on the right isolation steering circuit 24 and diodes D6 and D7 located in the left isolation steering circuit 26 operate as follows:

a. When the vehicle engine is operation and the manual frontlight switch 54 is off, the MOSFET's Q2 and Q3 are conducting and the D.R.L. adapter kit 10 is enabled. In the enabled condition, the battery/alternator voltage passes through the MOSFET's Q2 and Q3 through the diodes D4 and D6 to the "low beam" bulb filaments causing the lights to illuminate. The diodes D5 and D7 prevent current from flowing to the low-beam terminal of the frontlight switch. the diodes D2 and D3 are not functional at this time.

b. When the low-beam terminal of the frontlight switch is on, current passes through diodes D5 and D7 to the "low beam" filaments causing the lights to illuminate. The diodes D4 and D6 block this current from the MOSFET'S Q2 and Q3 even though Q2 and Q3 are currently conducting. When the low-beam terminal of the frontlight switch is closed, current also flows through diode D2 and through resistor R4 wherefrom the fifth signal is produced. The fifth signal overrides the fourth signal and causes the gate voltage of MOSFET's Q2 and Q3 to rise to their shut-off level which disables the D.R.L. adapter kit 10, and c. When the high-beam terminal of the frontlight switch is ON, current passes through diode D3 and through resistor R4 wherefrom the fifth signal is produced. The fifth signal overrides the fourth signal and causes MOSFET's Q2 and Q3 to turn OFF and disable the D.R.L. adapter kit 10.

The second design configuration of the D.R.L. adapter kit 10, as shown in FIGS. 2A and 2B, utilizes an electronic unit 14 which operates in combination with a vehicle that includes: and engine 50, a battery/alternator 52, a manual frontlight switch 54 having a low-beam terminal 55; a right switch receptacle 70 having a pin A connected to circuit ground, and a pin B connected to the low-beam terminal 55 of the frontlight switch 54; a right headlight receptacle 72 having a pin A and a pin B connected across the filament of a right low-beam bulb 74; a left switch receptacle 76 having a pin A connected to circuit ground and a pin B connected to the low-beam terminal 55 of the frontlight switch 54; a left headlight receptacle 78 having a pin A, and a pin B connected across the filament of a left low-beam bulb 80.

The D.R.L. adapter kit 10 is comprised of the following major elements: an enclosure 12 into which is enclosed an electronic unit 14. The unit 14 is further comprised of a circuit protective device, such as a fuse F1, which may be located either internal or external to the enclosure 12; a threshold circuit 16, a master switching circuit 18, a D.R.L. override circuit 20, a light switching circuit 22, a right isolation steering circuit 24, and a left isolation steering circuit 26. External to the electronic unit 14 extends a first cable assembly 40 connected to a right switch connector 30, a second cable assembly 42 connected to a right headlight connector 32, a third cable assembly 44 connected to a left switch connector 34, and a fourth cable assembly 46 connected to a left headlight connector 36.

To commence the operation of the D.R.L. adapter kit 10, the voltage from the battery 52 is applied to the electronic unit 14 through the fuse F1. As shown in FIG. 2A, the fuse has a first side that is connected to the vehicle battery/alternator 52 and a second side from where is produced a first signal which corresponds to the voltage of the battery/alternator 52.

The battery/alternator voltage is applied to the threshold circuit 16 which is comprised of a zener diode D1 having an anode and a cathode, and a resistor R1 having a first side and a second side. The cathode of D1 is applied to the first signal from the fuse F1 and the anode of D1 is connected to the first side of resistor R1. From the junction of diode D1 and resistor R1 is produced a second signal and from the second side of resistor R1 is connected a third signal that is connected to circuit ground. As shown in FIG. 2A, the threshold circuit may also include a variable resistor R5 that is connected to the junction of diode D1 and resistor R1. The resistor R5 further controls the accuracy of voltage of the second signal which is applied to the base of transistor Q1 as discussed infra.

The master switching circuit 18 is comprised of an NPN transistor Q1 having a base, a collector and an emitter. A resistor R2 having a first side and a second side and a resistor R3 also having a first side and a second side. The first side of resistor R3 is connected to the collector of transistor Q1 and the second side is connected in series with the first side of the resistor R2. The second side of resistor R2 is also connected to the first signal as shown in FIG. 1A. The second signal from the threshold circuit 16 is applied to the base of transistor Q1 and the emitter of Q1 is connected to circuit ground via the third signal. From the junction of resistors R2 and R3 is produced a fourth signal.

The DRL override circuit 20 is comprised of a resistor R4 having a first side and a second side, and a diode D2 having an anode and a cathode. The cathode of diodes D2 connected to the first side of resistor R4, the anode of diode D2 is applied a seventh signal and from the second side of resistor R4 is produced a fifth signal. The derivation of the seventh signal is described infra.

The light switching circuit 22 is comprised of a pair of p-channel power MOSFET's Q2 and Q3 each having a gate, a source and a drain. The gate of Q2 is connected to the gate of Q3 and both gates are connected to a junction consisting of the fourth and fifth signals wherefrom is produced a sixth signal. The source of Q2 is connected to the source of Q3 and both sources are connected to the first signal applied from the second side of the fuse F1. From the drain of Q2 is produced a ninth signal and from the drain of Q3 is produced a tenth signal.

The right isolation steering circuit 24 consists of a pair of diodes D4 and D5, each having an anode and a cathode. To the anode of D4 is applied the ninth signal from the light switching circuit 22 as shown in FIG. 1B. The cathodes of diodes D4 and D5 are connected together to form a junction from where is produced an eleventh signal. To the anode of diode D5 is applied the seventh signal as described infra.

The left isolation steering circuit 26 consists of a pair of diodes D6 and D7, each having an anode and a cathode where to the anode of D6 is applied the tenth signal from the light switching circuit 22. The cathodes of diodes D6 and D7 are connected together to form a junction from where is produced a twelfth signal and to the anode of diode D7 is applied a thirteenth signal. The right switch connector 30 includes a pin A wherefrom is produced the grounded third signal and a pin B from where the seventh signal is produced. The right switch connector 30 is connected to the right switch receptacle 70 via the first cable assembly 40 as shown in FIG. 2B.

The right headlight connector 32 includes a pin A that receives the eleventh signal and a pin B that receives the grounded third signal. The right headlight connector 32 is connected to the right headlight receptacle 72 via the second cable assembly 42.

The left switch connector 34, as shown in FIG. 2B, includes a pin A wherefrom is produced a grounded fourteenth signal and a pin B from where the thirteenth signal is produced. The left switch connector 34 is connected to the left switch receptacle 76 via the third cable assembly 44.

The final element that comprises the D.R.L. adapter kit 10 is the left headlight connector 36. This connector has a pin A that is also connected to the fourteenth signal from pin A of the left switch connector 34, and a pin B that receives the twelfth signal. The left headlight connector 36 is connected to the left headlight receptacle 78 via the fourth cable assembly 46.

Operation

The operation of the D.R.L. adapter 10 is shown in the D.R.L. flow diagram of FIG. 4 and functions in accordance with the following steps:

1. The D.R.L. adapter kit 10 is disabled when the vehicle engine 50 is off and the manual frontlight switch 54 is off. The first signal, which is the nominal battery voltage of between 12 to 13.5 volts, is applied from fuse F1 to the threshold circuit 16. From the circuit 16 the second and third signals are produced.

2. The second signal is applied from the threshold circuit 16 to the base of transistor Q1 located in the master switching circuit 18. Transistor Q1 is below its "turn on" level thus, Q1 remains off and no current flows through resistor R2, resistor R3 and transistor Q1. Additionally, there is no voltage drop across resistor R2 which causes the fourth signal and the voltage at the collector of Q1 to remain at the nominal battery voltage. The fourth signal is applied to the gate leads of MOSFET's Q2 and Q3 located in the light switching circuit 22, preventing the MOSFET's Q2 and Q3 from conducting which maintains the D.R.L. adapter kit 10 in the disabled condition and keeps the lights off.

3. When the vehicle engine 50 is started with the frontlight switch 54 still in the off position, the vehicle alternator 52 produces a voltage that ranges between 13.8 to 14.2 volts. When this voltage, which is higher than the nominal battery voltage, is applied to the threshold circuit 16, the second signal is produced an applied to the base of transistor Q1 located in the master switching circuit 18. The application of the second signal allows the threshold level of Q1 to be exceeded causing Q1 to conduct. When Q1 conducts, it produces a voltage drop across resistor R2 causing the fourth signal to decrease to the lower voltage level.

4. The fourth signal from the master switching circuit 18 is applied to the gates of MOSFET's Q2 and Q3 causing them to conduct. The conducting MOSFET Q2 allows the ninth signal from Q2 to pass through diode D4 to produce the eleventh signal which is then applied to the right headlight connector 32 and the right headlight receptacle 72. The application of the eleventh signal closes the circuit for the third signal which then enables the D.R.L. adapter kit 10 causing the right light to illuminate. Likewise, the conducting MOSFET Q3 allows the tenth signal from Q3 to pass through the diode D6 and allow the twelfth signal to be produced which is applied to the left headlight connector 36 and the left headlight receptacle 78. The application of the twelfth signal closes the circuit for the fourteenth signal which then causes the left light to illuminate.

5. The diode D2 located in the DRL override circuit 20, diodes D4 and D5 located on the right isolation steering circuit 24 and diodes D6 and D7 located in the left isolation steering circuit 26 operate as follows:

a. When the vehicle engine is operating and the manual frontlight switch 54 is off, the MOSFET's Q2 and Q3 are conducting and the D.R.L. adapter kit 10 is enabled. In the enabled condition, the battery/alternator voltage passes through the MOSFET's Q2 and Q3 through the diodes D4 and D6 to the bulb filaments causing the lights to illuminate. The diodes D5 and D7 prevent current from flowing to the low-beam terminal 55 of the frontlight switch 54. The diode D2 is not functional at this time.

b. When the low-beam terminal 55 of the frontlight switch is closed, current passes through diodes D5 and D7 to the bulb filaments causing the lights to illuminate. The diodes D4 and D6 block this current from the MOSFET's Q2 and Q3 even though Q2 and Q3 are currently conducting. When the low-beam terminal of the frontlight switch is closed, current also flows through diode D2, passes through resistor R4 and causes the gate voltage of MOSFET's Q2 and Q3 to rise to their shut off level which disables the D.R.L. adapter kit 10.

The third design configuration of the D.R.L. adapter kit 10, as shown in FIGS. 3A and 3B, utilizes an electronic unit 14 which operates in combination with a vehicle that includes: an engine 50, a battery/alternator 52, a manual frontlight switch 54 having a fog light or auxiliary light terminal 59; a right switch receptacle 82 having a pin A connected to circuit ground, a pin B connected to the terminal 59 of the frontlight switch 54 and a pin C connected, via a single wire, to a terminal of the desired light switch; a right light receptacle 84 having a pin A and a pin B connected across the filament of a right fog light or auxiliary light 86; a left switch receptacle 88 having a pin A connected to circuit ground and a pin B connected to the terminal 59 of the frontlight switch 54; a left light receptacle 90 having a pin A and a pin B connected across the filament of a left fog light or auxiliary light 92.

The D.R.L. adapter kit 10 is comprised of the following major elements: and enclosure 12 into which is enclosed an electronic unit 14. The unit 14 is further comprised of a circuit protective device, such as a fuse F1, which may be located either internal or external to the enclosure 12; a threshold circuit 16, a master switching circuit 18, a D.R.L. override circuit 20, a light switching circuit 22, a right isolation steering circuit 24, and a left isolation steering circuit 26. External to the electronic unit 14 extends a first cable assembly 40 connected to a right switch connector 30, a second cable assembly 42 connected to a right headlight connector 32, a third cable assembly 44 connected to a left switch connector 34, and a fourth cable assembly 46 connected to a left headlight connector 36.

To commence the operation of the D.R.L. adapter kit 10, the voltage from the battery 52 is applied to the electronic unit 14 through the fuse F1. As shown in FIG. 3A, the fuse has a first side that is connected to the vehicle battery/alternator 52 and a second side from where is produced a first signal which corresponds to the voltage of the battery/alternator 52.

The battery/alternator voltage is applied to the threshold circuit 16 which is comprised of a zener diode D1 having an anode and a cathode, and a resistor R1 having a first side and a second side. The cathode of D1 is applied to the first signal from the fuse F1 and the anode of D1 is connected to the first side of resistor R1. From the junction of diode D1 and resistor R1 is produced a second signal and from the second side of resistor R1 is connected a third signal that is connected to circuit ground. As shown in FIG. 3A, the threshold circuit may also include a variable resistor R5 that is connected to the junction of diode D1 and resistor R1. /the resistor R5 further controls the accuracy of the voltage of the second signal which is applied to the base of transistor Q1 as discussed infra.

The master switching circuit 18 is comprised of an NPN transistor Q1 having a base, a collector and an emitter. A resistor R2 having a first side and a second side and a resistor R3 also having a first side and a second side. The first side of resistor R3 is connected to the collector of transistor Q1 and the second side is connected in series with the first side of the resistor R2. The second side of resistor R2 is also connected to the first signal as shown in FIG. 1A. The second signal from the threshold circuit 16 is applied to the base of transistor Q1 and the emitter of Q1 is connected to circuit ground via the third signal. From the junction of resistors R2 and R3 is produced a fourth signal.

The DRL override circuit 20 is comprised of a resistor R4 having a first side and a second side, and a diode D2 having an anode and a cathode. The cathode of diodes D2 connected to the first side of resistor R4, the anode of diode D2 is applied a seventh signal and from the second side of resistor R4 is produced a fifth signal. The derivation of the seventh signal is described infra.

The light switching circuit 22 is comprised of a pair of p-channel power MOSFET's Q2 and Q3 each having a gate, a source and a drain. The gate of Q2 is connected to the gate of Q3 and both gates are connected to the gate of Q3 and both gates are connected to a junction consisting of the fourth and fifth signals wherefrom is produced a sixth signal. The source of Q2 is connected to the source of Q3 and both sources are connected to the first signal applied from the second side of the fuse F1. From the drain of Q2 is produced a ninth signal and from the drain of Q3 is produced a tenth signal.

The right isolation steering circuit 24 consists of a pair of diodes D4 and D5, each having an anode and a cathode. To the anode of D4 is applied the ninth signal from the light switching circuit 22 as shown in FIG. 3B. The cathodes of diodes D4 and D5 are connected together to form a junction from where is produced an eleventh signal. To the anode of diode D5 is applied the seventh signal as described infra.

The left isolation steering circuit 26 consists of a pair of diodes D6 and D7, each having an anode and a cathode where to the anode of D6 is applied the tenth signal from the light switching circuit 22. The cathodes of diodes D6 and D7 are connected together to form a junction from where is produced a twelfth signal and to the anode of diode D7 is applied a thirteenth signal.

The right switch connector 30 includes a pin A connected to the grounded third signal, a pin B from where the seventh signal is produced and a pin C wherefrom is produced an eighth signal. The right switch connector 30 is connected to the right switch receptacle 82 via the first cable assembly 40 as shown in FIG. 3B. Pin C of the receptacle 82 is connected to the terminal of the desired vehicle light switch via a single wire.

The right headlight connector 32 includes a pin A that receives the eleventh signal and a pin B that receives the grounded third signal. The right headlight connector 32 is connected to the right headlight receptacle 84 via the second cable assembly 42.

The left switch connector 34, as shown in FIG. 3B, includes a pin A wherefrom is produced a grounded fourteenth signal and a pin B from where the thirteenth signal is produced. The left switch connector 34 is connected to the left switch receptacle 88 via the third cable assembly 44.

The final element that comprises the D.R.L. adapter kit 10 is the left headlight connector 36. This connector has a pin A that is connected to the fourteenth signal from pin A of the left switch connector 34 and a pin B that receives the twelfth signal. The left headlight connector 36 is connected to the left headlight receptacle 90 via the fourth cable assembly 46.

Operation

The operation of the D.R.L. adapter 10 is shown in the D.R.L. flow diagram of FIG. 4 and functions in accordance with the following steps:

1. The D.R.L. adapter kit 10 is disabled when the vehicle engine 50 is off and the manual frontlight switch 54 is off. The first signal, is the nominal battery voltage which ranges between 12 to 13.5 volts. The first signal is applied from fuse F1 to the threshold circuit 16 from where the second and third signals are produced.

2. The second signal is applied from the threshold circuit 16 to the base of transistor Q1 located in the master switching circuit 18. Transistor Q1 is below its "turn on" level thus, Q1 remains off and no current flows through resistor R2, resistor R3 and transistor Q1. Additionally, there is no voltage drop across resistor R2 which causes the fourth signal and the voltage at the collector of Q1 to remain at the nominal battery voltage. The fourth signal is applied to the gate leads of MOSFET's Q2 and Q3 located in the light switching circuit 22, preventing the MOSFET's Q2 and Q3 from conducting which maintains the D.R.L. adapter kit 10 in the disabled condition and keeps the lights off.

3. When the vehicle engine 50 is started with the frontlight switch 54 still in the off position, the vehicle alternator 52 produces a voltage level that is higher than the nominal battery voltage. When this higher voltage is applied to the threshold circuit 16, the second signal is produced and applied to the base of transistor Q1 located in the master switching circuit 18. The application of the second signal allows the threshold level of Q1 to be exceeded causing Q1 to conduct. When Q1 conducts, it produces a voltage drop across resistor R2 causing the fourth signal to decrease to the lower voltage level.

4. The fourth signal from the master switching circuit 18 is applied to the gates of MOSFET's Q2 and Q3 causing them to conduct. The conducting MOSFET's allow the ninth signal from Q2 to pass through diode D4 to produce the eleventh signal which is then applied to the right headlight connector 32 and the right headlight receptacle 84. The application of the eleventh signal closes the circuit for the third signal which then enables the D.R.L. adapter kit 10 causing the right light to illuminate. Likewise, the conducting MOSFET Q3 allows the tenth signal to pass through the diode D6 and allow the twelfth signal to be produced which is applied to the left headlight connector 36 and the left headlight receptacle 90. The application of the twelfth signal closes the circuit for the fourteenth signal which then causes the left light to illuminate.

5. The diodes D2 and D3 located in the DRL override circuit 20, diodes D4 and D5 located on the right isolation steering circuit 24 and diodes D6 and D7 located in the left isolation steering circuit 26 operate as follows:

a. When the vehicle engine is operating and the manual frontlight switch 54 is off, the MOSFET's Q2 and Q3 are conducting and the D.R.L. adapter kit 10 is enabled. In the enabled condition, the battery/alternator voltage passes through the MOSFET's Q2 and Q3 through the diodes D4 and D6 to the bulb filaments causing the lights to illuminate. The diodes D5 and D7 prevent current from flowing to the terminal 59 of the frontlight switch 54. The diodes D2 and D3 are not functional at this time.

b. When the terminal 59 of the frontlight switch is closed, current passes through diodes D5 and D7 to the bulb filaments causing the lights to illuminate. The diodes D4 and D6 block this current from the MOSFET's Q2 and Q3 even though Q2 and Q3 are currently conducting. When the low-beam terminal of the frontlight switch is closed, current also flows through diode D2, passes through resistor R4 and causes the gate voltage of MOSFET's Q2 and Q3 to rise to their shut off level which disables the D.R.L. adapter kit 10.

c. When pin C of the right switch connector is connected to the terminal of the desired light switch as shown in FIG. 3B, the eighth signal is produced and the current passes through diode D3 and through resistor R4 wherefrom the fifth signal is produced. The fifth signal overrides the fourth signal and causes MOSFET's Q2 and Q3 to turn off and disable the D.R.L. adapter kit 10.

While the invention has been described in complete detail and pictorially shown in the accompanying drawings it is not to be limited to such details, since many changes and modifications may be made in the invention without departing from the spirit and scope thereof. For example, as shown in FIGS. 1B, 2B, and 3B, the inward ends of the cable assemblies 40–46 are hardwired to a circuit element within the enclosure 12 and extended out the enclosure 12 through a set of grommets 38 to the connectors 30–36. Alternatively, the internal leads of the cable assemblies 40–46 can be hardwired to receptacles mounted to the enclosure (not shown). The inward ends of the cable assemblies are attached to connectors that are indexed to be attached to the corresponding cable receptacles. Hence, it is described to cover any and all modifications and forms which may come within the language and scope of the appended claims.

We claim:

1. A daytime running lights adapter kit which operates in combination with a vehicle which includes: an engine; a battery/alternator; a manual frontlight switch having a low-beam terminal and a high-beam terminal; a right switch receptacle having a pin A connected to circuit ground, a pin B connected to the low-beam terminal of the frontlight switch and a pin C connected to the high-beam terminal of the frontlight switch; a right headlight receptacle having a pin A, a pin B and a pin C; a right bulb or sealed beam light having a high beam filament connected to pin A of the right headlight receptacle, a low beam filament connected to pin B of the right headlight receptacle and a common filament lead connected to pin C of the right headlight receptacle; a left switch receptacle having a pin A connected to circuit ground, a pin B connected to the low-beam terminal of the frontlight switch and a pin C connected to the high-beam terminal of the frontlight switch; a left headlight receptacle having a pin A, a pin B and a pin C; a left bulb or sealed beam light having a high beam filament connected to pin A of the left headlight receptacle, a low beam filament connected to pin B of the left headlight receptacle and a common filament lead connected to pin C of the left headlight receptacle, wherein said daytime running lights adapter kit comprises:

a) a circuit protective device having a first side connected to said vehicle battery/alternator and a second side from where is produced a first signal corresponding to the battery/alternator voltage, b) a threshold circuit comprising a zener diode D1 having an anode and a cathode, and a resistor R1 having a first side and a second side, wherein the cathode of D1 is applied the first signal and the anode of D1 is connected to the first side of resistor R1, wherein from the junction of diode D1 and resistor R1 is produced a second signal and from the second side of resistor R1 is produced a third signal that is connected to circuit ground, c) a master switching circuit comprising an NPN transistor Q1 having a base, a collector and an emitter, a resistor R3 having a first side connected to the collector of transistor Q1 and a second side connected in series to a first side of a resistor R2 having a second side connected to the first signal, wherein the second signal is applied to the base of transistor Q1 and the emitter of Q1 is connected to circuit ground via the third signal, and wherein from the junction of resistors R2 and R3 is produced a fourth signal, d) a DRL override circuit comprising a resistor R4 having a first side and a second side, and a pair of diodes D2 and D3 each having an anode and a cathode, wherein the cathode of diodes D2 and D3 are connected together to form a junction which is connected to the first side of resistor R4, wherein from the second side of resistor R4 is produced a fifth signal, to the anode of diode D2 is applied a seventh signal and to the anode of diode D3 is applied an eighth signal, e) a light switching circuit comprising a pair of p-channel power MOSFET's Q2 and Q3 each having a gate, a source and a drain, wherein the gate of Q2 is connected to the gate of Q3 and both gates are connected to a junction consisting of the fourth and fifth signals wherefrom is produced a sixth signal; wherein the source of Q2 is connected to the source of Q3 and both sources are connected to the first signal; and wherein from the drain of Q2 is produced a ninth signal and from the drain of Q3 is produced a tenth signal, f) a right isolation steering circuit comprising a pair of diodes D4 and D5, wherein to the anode of D4 is applied the ninth signal, and wherein the cathodes of diodes D4 and D5 are connected together to form a junction from where is produced an eleventh signal and wherein the anode of diode D5 is applied the seventh signal, g) a left isolation steering circuit comprising a pair of diodes D6 and D7, wherein to the anode of D6 is applied the tenth signal, and wherein the cathodes of diodes D6 and D7 are connected together to form a junction from where is produced a twelfth signal and to the anode of diode D7 is applied a thirteenth signal, h) a right switch connector having a pin A connected to the grounded third signal, a pin B from where the seventh signal is produced and a pin C wherefrom is produced an eighth signal, wherein said right switch connector is connected to the right switch receptacle via a first cable assembly, i) a right headlight connector having a pin A that receives the eighth signal, a pin B that receives the eleventh signal and a pin C that is connected to the grounded third signal, wherein said right headlight connector is connected to the right headlight receptacle via a second cable assembly, j) a left switch connector having a pin A wherefrom is produced a grounded fifteenth signal, a pin B from where the thirteenth signal is produced and a pin C from where a fourteenth signal is produced, wherein said left switch connector is connected to the left switch receptacle via a third cable assembly, and k) a left headlight connector having a pin A connected to the fourteenth signal from pin C of said left switch connector, a pin B that receives the twelfth signal and a pin C that is grounded via the fifteenth signal that is connected to pin A of said switch connector, wherein said left headlight connector is connected to the left headlight receptacle via a fourth cable assembly wherein:

(1) when the vehicle engine is off and the frontlight switch is off, the first signal, which is the nominal battery voltage, is applied to said threshold circuit from where the second and third signals are produced, (2) the second signal, which is applied to the base of transistor Q1, is below the "turn on" level of Q1 thus Q1 remains off and no current flows through resistor R2, resistor R3 and transistor Q1, there is also no voltage drop across resistor R2 which causes the fourth signal and the voltage at the collector of Q1 to remain at the nominal battery voltage, wherein the fourth signal is applied to the gate leads of MOSFET's Q2 and Q3 located in said light switching circuit, preventing said MOSFET's Q2 and Q3 from conducting which keeps the bulb of sealed beam lights off, (3) wherein when the vehicle engine is started with the manual light switch still in the off position, the vehicle alternator produces a voltage level higher than the nominal battery voltage, wherein when this higher voltage is applied to the threshold circuit, the second signal is produced and applied to the base of transistor Q1, wherein the application of the second signal allows the threshold level of Q1 to be exceeded causing Q1 to conduct which produces a voltage drop across resistor R2 causing the fourth signal to decrease to the lower voltage level, (4) wherein the fourth signal from said master switching circuit is applied to the gates of said MOSFET's Q2 and Q3 causing them to conduct allowing the ninth signal from Q2 to pass through said diode D4 and to produce the eleventh signal which is applied to said right headlight connector and the right headlight receptacle, wherein the application of the eleventh signal closes the circuit for the night low beam filament which then allows the "low beam" of the right bulb or sealed beam light to turn on, likewise, the conducting said MOSFET Q3 allows the tenth signal to pass through said diode D6 and allow the twelfth signal, to be produced which is applied to said left headlight connector and the left headlight receptacle, wherein the application of the twelfth signal closes the circuit for the left low-beam filament which then allows the "low beam" of the left bulb or sealed beam light to turn on, (5) wherein said diodes D2 and D3 located in said DRL override circuit, diodes D4 and D5 located on said right isolation steering circuit and diodes D6 and D7 located in said left isolation steering circuit operate as follows:

(a) when said vehicle engine is operating and the manual headlight switch is off, said MOSFET's Q2 and Q3 are conducting and said daytime running lights adapter kit is operational, in the operational condition, the battery/alternator voltage passes through said MOSFET's Q2 and Q3 through said diodes D4 and D6 to the "low beam" bulb filaments causing the lights to illuminate, wherein said diodes D5 and D7 prevent current from flowing to the low-beam terminal of the frontlight switch and wherein said diodes D2 and D3 are not functional at this time, (b) wherein when the low-beam terminal of the frontlight switch is on, current passes through said diode D5 and D7 to the "low beam" bulb filaments causing the lights to illuminate, wherein said diodes D4 and D6 block this current from said MOSFET's Q2 and Q3 even though Q2 and Q3 are currently conducting, wherein when the low-beam terminal of the frontlight switch is closed, current also flows through said diode D2, passes through said resistor R4 wherefrom the fifth signal is produced, wherein the fifth signal overrides the fourth signal and causes the gate voltage of MOSFET's Q2 and Q3 to rise to their shut off level which disables said daytime running lights adapter kit, and (c) wherein when the high-beam terminal of the frontlight switch is ON, current passes through said diode D3 and then through resistor R4 wherefrom the fifth signal is produced, the fifth signal overrides the fourth signal and causes MOSFET's Q2 and Q3 to turn OFF.

2. The kit as specified in claim 1 wherein said bulb is comprised of an H4 bulb.

3. The kit as specified in claim 1 wherein said threshold circuit further comprises a variable resistor R5 that is connected to the anode of diode D1 and resistor R1, wherein said resistor R5 further controls the accuracy of the initial voltage to produce the second signal which is derived from the junction of R1 and R5 and is applied to the base of transistor Q1.

4. A daytime running lights adapter kit which operates in combination with a vehicle which includes: an engine; a battery/alternator; a manual frontlight switch having a low-beam terminal; a right switch receptacle having a pin A connected to circuit ground, and a pin B connected to the low-beam terminal of the frontlight switch; a right headlight receptacle having a pin A and a pin B connected across the filament of a right low-beam bulb; a left switch receptacle having a pin A connected to circuit ground, and a pin B connected to the low-beam terminal of the frontlight switch; a left headlight receptacle having a pin A and a pin B connected across the filament of a left low-beam bulb, wherein said daytime running lights adapter kit comprises:

a) a circuit protective device having a first side connected to said vehicle battery/alternator and a second side from where is produced a first signal corresponding to the battery/alternator voltage, b) a threshold circuit comprising a zener diode D1 having an anode and a cathode, and a resistor R1 having a first side and a second side, wherein the cathode of D1 is applied the first signal and the anode of D1 is connected to the first side of resistor R1, wherein from the junction of diode D1 and resistor R1 is produced a second signal and from the second side of resistor R1 is produced a third signal that is connected to circuit ground, c) a master switching circuit comprising an NPN transistor Q1 having a base, a collector and an emitter, a resistor R3 having a first side connected to the collector of transistor Q1 and a second side connected in series to a first side of a resistor R2 having a second side connected to the first signal, wherein the second signal is applied to the base of transistor Q1 and the emitter of Q1 is connected to circuit ground via the third signal, and wherein from the junction of resistors R2 and R3 is produced a fourth signal, d) a DRL override circuit comprising a resistor R4 having a first side and a second side, and a diode D2 having an anode and a cathode, wherein the cathode of diode D2 is connected to the first side of resistor R4, the anode of diode D2 is applied a seventh signal and from the second side of resistor R4 is produced a fifth signal, e) a light switching circuit comprising a pair of p-channel power MOSFET's Q2 and Q3 each having a gate, a source and a drain, wherein the gate of Q2 is connected to the gate of Q3 and both gates are connected to a junction consisting of the fourth and fifth signals wherefrom is produced a sixth signal; wherein the source of Q2 is connected to the source of Q3 and both sources are connected to the first signal; and wherein from the drain of Q2 is produced a ninth signal and from the drain of Q3 is produced a tenth signal, f) a right isolation steering circuit comprising a pair of diodes D4 and D5, wherein to the anode of D4 is applied the ninth signal, and wherein the cathodes of diodes D4 and D5 are connected together to form a junction from where is produced an eleventh signal and wherein the anode of diode D5 is applied the seventh signal, g) a left isolation steering circuit comprising a pair of diodes D6 and D7, wherein to the anode of D6 is applied the tenth signal, and wherein the cathodes of diodes D6 and D7 are connected together to form a junction from where is produced a twelfth signal and to the anode of diode D7 is applied a thirteenth signal, h) a right switch connector having a pin A connected to the grounded third signal, and a pin B from where the seventh signal is produced, wherein said right switch connector is connected to said right switch receptacle, i) a right headlight connector having a pin A that receives the eleventh signal and a pin B that is connected to the grounded third signal, wherein said right headlight connector is connected to said right headlight receptacle, j) a left switch connector having a pin A connected to the grounded fourteenth signal and a pin B from where the thirteenth signal is produced, wherein said left switch connector is connected to said left switch receptacle, and k) a left headlight connector having a pin A connected to the grounded fourteenth signal and a pin B that receives the twelfth signal, wherein said left headlight connector is connected to said left headlight receptacle, wherein:

(1) when the vehicle engine is off and the frontlight switch is off, the first signal, which is the nominal battery voltage, is applied to said threshold circuit from where the second and third signals are produced, (2) the second signal, which is applied to the base of transistor Q1, is below the "turn on" level of Q1 thus Q1 remains off and no current flows through resistor R2, resistor R3 and transistor Q1, there is also no voltage drop across resistor R2 which causes the fourth signal and the voltage at the collector of Q1 to remain at the nominal battery voltage, wherein the fourth signal is applied to the gate leads of MOSFET's Q2 and Q3 located in said light switching circuit, preventing said MOSFET's Q2 and Q3 from conducting which keeps the lights off, (3) wherein when the vehicle engine is started with the manual light switch still in the off position, the vehicle alternator produces a voltage level higher than the nominal battery voltage wherein when this higher voltage is applied to the threshold circuit, the second signal is produced and applied to the base of transistor Q1, wherein the application of the second signal allows the threshold level of Q1 to be exceeded causing Q1 to conduct which produces a voltage drop across resistor R2 causing the fourth signal to decrease to the lower voltage level, (4) wherein the fourth signal from said master switching circuit is applied to the gates of said MOSFET's Q2 and Q3 causing them to conduct allowing the ninth signal from Q2 to pass through said diode D4 and to produce the eleventh signal which is applied to said right headlight connector and the right headlight receptacle, wherein the application of the eleventh signal closes the circuit for the right low-beam filament which then allows the right light to illuminate, likewise, the conducting said MOSFET Q3 allows the tenth signal to pass through said diode D6 and allow the twelfth signal, to be produced which is applied to said left headlight connector and the left headlight receptacle, wherein the application of the twelfth signal closes the circuit for the left low-beam filament which then allows the left light to illuminate, (5) wherein said diode D2 located in said DRL override circuit, diodes D4 and D5 located on said right isolation steering circuit and diodes D6 and D7 located in said left isolation steering circuit operate as follows:

(a) when said vehicle engine is operating and the manual headlight switch is off, said MOSFET's Q2 and Q3 are conducting and said daytime running lights adapter kit is operational, in the operational condition, the battery/alternator voltage passes through said MOSFET's Q2 and Q3 through said diodes D4 and D6 to the bulb filaments causing the lights to illuminate, wherein said diodes D5 and D7 prevent current from flowing to the low-beam terminal of the frontlight switch and wherein said diode D2 is not functional at this time, and (b) wherein when the low-beam terminal of the frontlight switch is closed, current passes through said diodes D5 and D7 to the bulb filaments causing the lights to illuminate, wherein said diodes D4 and D6 block this current from said MOSFET's Q2 and Q3 even though Q2 and Q3 are currently conducting, wherein when the low-beam terminal of the frontlight switch is closed, current also flows through said diode D2, passes through said resistor R4 and causes the gate voltage of MOSFET's Q2 and Q3 to rise to their shut off level which disables said daytime running lights adapter kit.

5. The kit as specified in claim 4 wherein said low-beam bulb is further comprised of a 9005 bulb.

6. The kit as specified in claim 5 wherein said threshold circuit further comprises a variable resistor R5 that is connected to the anode of diode D1 and resistor R1, wherein said resistor R5 further controls the accuracy of the initial voltage to produce the second signal which is from the junction of R1 and R5 and is applied to the base of transistor Q1.

7. A daytime running lights adapter kit which operates in combination with a vehicle which includes: an engine; a battery/alternator; a manual frontlight switch having a fog light or auxiliary light terminal; a right switch receptacle having a pin A connected to circuit ground, a pin B connected to the frontlight switch and a pin C connected to a terminal of the desired light switch via a single wire; a right light receptacle having a pin A and a pin B connected across the filament of right fog light or auxiliary light; a left switch receptacle having a pin A connected to circuit ground and a pin B connected to the frontlight switch; a left light receptacle having a pin A and a pin B connected across the filament of a left fog light and auxiliary light; wherein said daytime running lights adapter kit comprises:

a) a circuit protective device having a first side connected to said vehicle battery/alternator and a second side from where is produced a first signal corresponding to the battery/alternator voltage, b) a threshold circuit comprising a zener diode D1 having an anode and a cathode, and a resistor R1 having a first side and a second side, wherein the cathode of D1 is applied the first signal and the anode of D1 is connected to the first side of resistor R1, wherein from the junction of diode D1 and resistor R1 is produced a second signal and from the second side of resistor R1 is produced a third signal that is connected to circuit ground, c) a master switching circuit comprising an NPN transistor Q1 having a base, a collector and an emitter, a resistor R3 having a first side connected to the collector of transistor Q1 and a second side connected in series to a first side of a resistor R2 having a second side connected to the first signal, wherein the second signal is applied to the base of transistor Q1 and the emitter of Q1 is connected to circuit ground via the third signal, and wherein from the junction of resistors R2 and R3 is produced a fourth signal, d) a DRL override circuit comprising a resistor R4 having a first side and a second side, and a pair of diodes D2 and D3 each having an anode and a cathode, wherein the cathode of diodes D2 and D3 are connected together to form a junction which is connected to the first side of resistor R4, wherein from the second side of resistor R4 is produced a fifth signal, to the anode of diode D2 is applied a seventh signal and to the anode of diode D3 is applied an eighth signal, e) a light switching circuit comprising a pair of p-channel power MOSFET's Q2 and Q3 each having a gate, a source and a drain, wherein the gate of Q2 is connected to the gate of Q3 and both gates are connected to a junction consisting of the fourth and fifth signals wherefrom is produced a sixth signal; wherein the source of Q2 is connected to the source of Q3 and both sources are connected to the first signal; and wherein from the drain of Q2 is produced a ninth signal and from the drain of Q3 is produced a tenth signal, f) a right isolation steering circuit comprising a pair of diodes D4 and D5, wherein to the anode of D4 is applied the ninth signal, and wherein the cathodes of diodes D4 and D5 are connected together to form a junction from where is produced an eleventh signal and wherein the anode of diode D5 is applied the seventh signal, g) a left isolation steering circuit comprising a pair of diodes D6 and D7, wherein to the anode of D6 is applied the tenth signal, and wherein the cathodes of diodes D6 and D7 are connected together to form a junction from where is produced a twelfth signal and to the anode of diode D7 is applied a thirteenth signal, h) a right switch connector having a pin A connected to the grounded third signal, a pin B from where the seventh signal is produced and a pin C wherefrom is produced an eighth signal, wherein said right switch connector is connected to the right switch receptacle via a first cable assembly, i) a right headlight connector having a pin A that receives the eleventh signal, and a pin B that receives the grounded third signal, wherein said right headlight connector is connected to the right headlight receptacle via a second cable assembly, j) a left switch connector having a pin A wherefrom is produced a grounded fourteenth signal, and a pin B from where the thirteenth signal is produced, wherein said left switch connector is connected to the left switch receptacle via a third cable assembly, and k) a left headlight connector having a pin A connected to the fourteenth signal derived from pin A of said left switch connector, and a pin B that receives the twelfth signal, wherein said left headlight connector is connected to the left headlight receptacle via a fourth cable assembly wherein:

(1) when the vehicle engine is off and the frontlight switch is off, the first signal, which is the nominal battery voltage, is applied to said threshold circuit from where the second and third signals are produced, (2) the second signal, which is applied to the base of transistor Q1, is below the "turn on" level of Q1 thus Q1 remains off and no current flows through resistor R2, resistor R3 and transistor Q1, there is also no voltage drop across resistor R2 which causes the fourth signal and the voltage at the collector of Q1 to remain at the nominal battery voltage, wherein the fourth signal is applied to the gate leads of MOSFET's Q2 and Q3 located in said light switching circuit, preventing said MOSFET's Q2 and Q3 from conducting which keeps the fog light or auxiliary lights off, (3) wherein when the vehicle engine is started with the manual light switch still in the off position, the vehicle alternator produces a voltage level higher than the nominal battery voltage, wherein when this higher voltage is applied to the threshold circuit, the second signal is produced and applied to the base of transistor Q1, wherein the application of the second signal allows the threshold level of Q1 to be exceeded causing Q1 to conduct which produces a voltage drop across resistor R2 causing the fourth signal to decrease to the lower voltage level, (4) wherein the fourth signal from said master switching circuit is applied to the gates of said MOSFET's Q2 and Q3 causing them to conduct allowing the ninth signal from Q2 to pass through said diode D4 and to produce the eleventh signal which is applied to said right headlight connector and the right headlight receptacle, wherein the application of the eleventh signal closes the circuit for the filament of the right light which then allows the right fog light or auxiliary light to turn on, likewise, the conducting said MOSFET Q3 allows the tenth signal to pass through said diode D6 and allow the twelfth signal, to be produced which is applied to said left headlight connector and the left headlight receptacle, wherein the application of the twelfth signal closes the circuit for the filament of the left light which then allows the left fog light or auxiliary light to turn on, (5) wherein said diodes D2 and D3 located in said DRL override circuit, diodes D4 and D5 located on said right isolation steering circuit and diodes D6 and D7 located in said left isolation steering circuit operate as follows:

(a) when said vehicle engine is operating and the manual headlight switch is off, said MOSFET's Q2 and Q3 are conducting and said daytime running lights adapter kit is operational, in the operational condition, the battery/alternator voltage passes through said MOSFET's Q2 and Q3 through said diodes D4 and D6 to the fog light or auxiliary light filaments causing the lights to illuminate, wherein said diodes D5 and D7 prevent current from flowing to the low-beam terminal of the frontlight switch and wherein said diodes D2 and D3 are not functional at this time, (b) wherein when the frontlight switch is closed, current passes through said diodes D5 and D7 to the fog light or auxiliary light filaments causing the lights to illuminate, wherein said diodes D4 and D6 block this current from said MOSFET's Q2 and Q3 even though Q2 and Q3 are currently conducting, wherein when the frontlight switch is closed, current also flows through said diode D2, passes through said resistor R4 and causes the gate voltage of MOSFET's Q2 and Q3 to rise to their shut off level which disables said daytime running lights adapter kit, and (c) wherein when the desired vehicle light switch is on, the eighth signal is produced, current passes through said diode D2 via terminal C, and then through resistor R4 wherefrom the fifth signal is produced, the fifth signal overrides the fourth signal and causes MOSFET's Q2 and Q3 to turn OFF.

8. The kit as specified in claim 7 wherein said threshold circuit further comprises a variable resistor R5 that is connected to the anode of diode D1 and the resistor R1, wherein said resistor R5 further controls the accuracy of the initial voltage to produce the second signal which is from the junction of R1 and R5 and is applied to the base of said transistor Q1.

* * * * *